United States Patent
Fujita

(10) Patent No.: US 10,280,891 B2
(45) Date of Patent: May 7, 2019

(54) VEHICLE CONTROL SYSTEM

(71) Applicant: DENSO CORPORATION, Kariya, Aichi-pref. (JP)

(72) Inventor: Tatsuya Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 153 days.

(21) Appl. No.: 15/336,924

(22) Filed: Oct. 28, 2016

(65) Prior Publication Data

US 2017/0130688 A1 May 11, 2017

(30) Foreign Application Priority Data

Nov. 10, 2015 (JP) ................................ 2015-220683

(51) Int. Cl.

| F02N 11/08 | (2006.01) |
|---|---|
| F02N 15/04 | (2006.01) |
| F02N 11/00 | (2006.01) |
| F02N 11/04 | (2006.01) |
| F02N 15/06 | (2006.01) |

(52) U.S. Cl.
CPC ........ *F02N 11/0851* (2013.01); *F02N 11/006* (2013.01); *F02N 11/0818* (2013.01); *F02N 11/0855* (2013.01); *F02N 15/04* (2013.01); *F02N 11/04* (2013.01); *F02N 11/0844* (2013.01); *F02N 15/067* (2013.01); *F02N 2200/022* (2013.01); *F02N 2200/0801* (2013.01); *F02N 2200/101* (2013.01); *F02N 2200/102* (2013.01); *F02N 2300/102* (2013.01)

(58) Field of Classification Search
CPC ............. F02N 11/0851; F02N 11/0855; F02N 2200/022; F02N 2200/0801; F02N 15/04
See application file for complete search history.

(56) References Cited

U.S. PATENT DOCUMENTS

| 9,638,155 | B2 * | 5/2017 | Kato ................... F02N 11/0855 |
|---|---|---|---|
| 2010/0033066 | A1 | 2/2010 | Murata et al. |
| 2010/0251851 | A1 | 10/2010 | Usami et al. |
| 2012/0103294 | A1 * | 5/2012 | Kitano ................ F02N 11/0814 |
| | | | 123/179.25 |
| 2012/0119497 | A1 | 5/2012 | Murata et al. |
| 2013/0135065 | A1 * | 5/2013 | Neet ........................ H01H 3/28 |
| | | | 335/72 |

(Continued)

FOREIGN PATENT DOCUMENTS

| JP | WO 2013046388 A1 * | 4/2013 | .......... F02N 11/0855 |
|---|---|---|---|
| JP | 2013-142288 A | 7/2013 | |

*Primary Examiner* — Erick R Solis
*Assistant Examiner* — Anthony L Bacon
(74) *Attorney, Agent, or Firm* — Oliff PLC

(57) ABSTRACT

A vehicle control system is provided which is used in a vehicle equipped with an engine as a drive power source and works to establish engagement of a pinion of a starter motor with a ring gear mounted on a rotational axis of the engine and then actuate the starter motor to start the engine. The vehicle control system executes a preset mode to move the pinion to achieve the engagement with the ring gear when the rotation speed of the engine has dropped below a given threshold value. The threshold value is determined as a function of speed of the vehicle, thereby alleviating a driver's perception about unwanted mechanical noise arising from impact the pinion on the ring gear upon the engagement therebetween.

6 Claims, 3 Drawing Sheets

(56) References Cited

U.S. PATENT DOCUMENTS

| | | | |
|---|---|---|---|
| 2016/0053736 A1* | 2/2016 | Matsufuji | F02N 11/0855 |
| | | | 701/112 |
| 2016/0245254 A1* | 8/2016 | Fujita | F02N 11/0851 |
| 2018/0209355 A1* | 7/2018 | Nakane | F02D 17/00 |

* cited by examiner

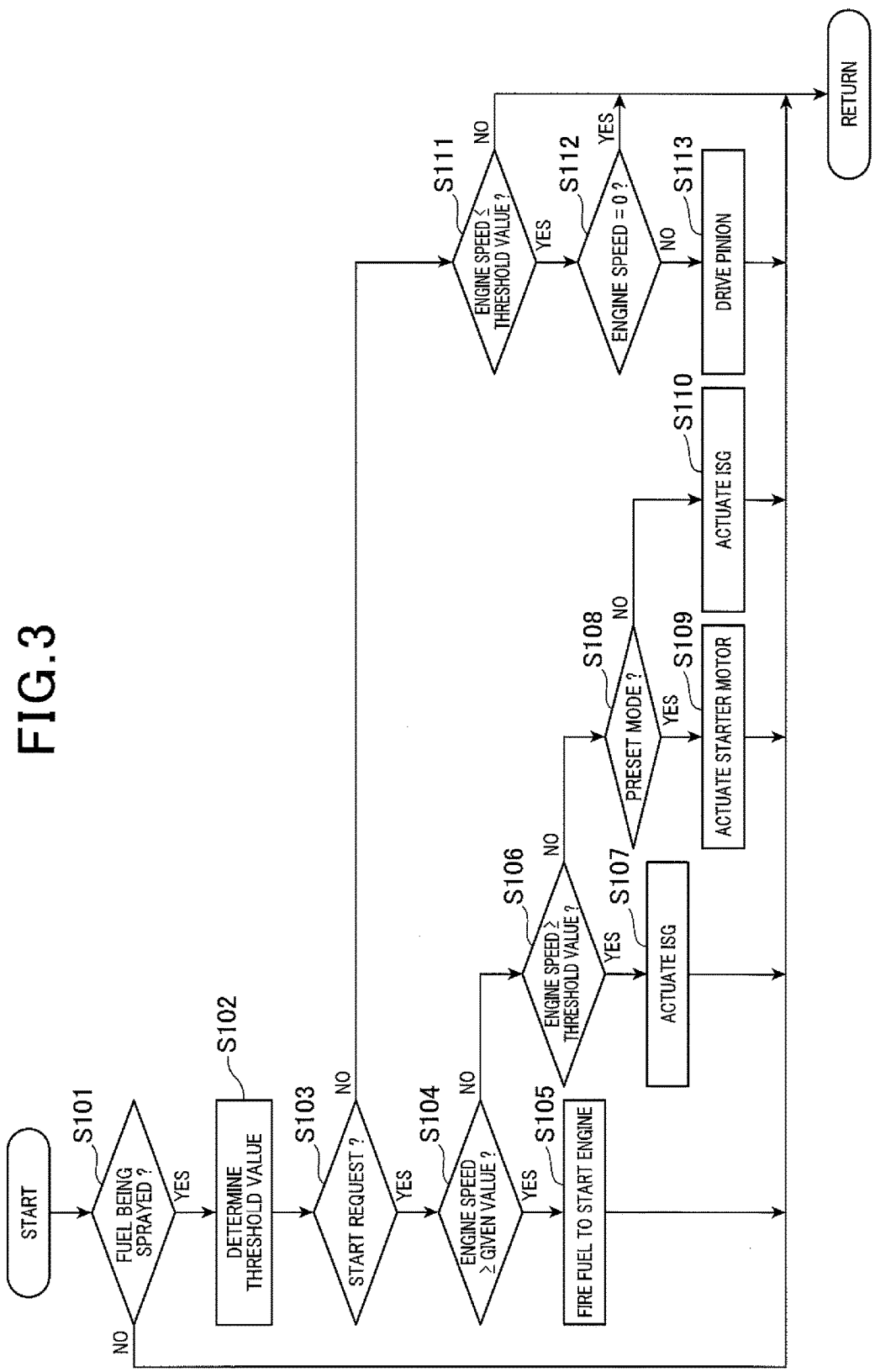

VEHICLE CONTROL SYSTEM

CROSS REFERENCE TO RELATED DOCUMENT

The present application claims the benefit of priority of Japanese Patent Application No. 2015-220683 filed on Nov. 10, 2015, the disclosure of which is incorporated herein by reference.

BACKGROUND

1 Technical Field

The invention relates generally to a vehicle control system for a vehicle which operates in a preset mode to establish a mechanical engagement between a pinion and a ring gear before re-starting an engine mounted in a vehicle.

2 Background Art

In order to save fuel in vehicles such as automobiles, modern vehicle control systems execute an idle stop mode or a coasting mode. The idle stop mode is to stop an engine such as an internal combustion engine when a driver is braking to the vehicle or after the vehicle is stopped. The coasting mode is to stop the engine during traveling of the vehicle to perform a natural deceleration. After the engine is stopped in either of these modes, it is necessary to quickly restart the engine in response to a start request made by the driver of the vehicle. Particularly, in the coasting mode, the vehicle needs to be accelerated quickly in response to a driver's acceleration request, thus requiring a rapid start of the engine.

Usually, when it is required to restart the engine, the vehicle control system brings a pinion mounted on a starter motor into engagement with a ring gear fit on a rotational axis of the engine and then energizes the starter motor. In the case where the starter motor is a general type, the restarting of the engine while the speed of the engine is decreasing, however, results in an excessive decrease in service life of the starter motor or an increased level of mechanical noise arising from impact of the pinion on the ring gear.

In order to alleviate the above problem, some of the vehicle control systems are designed to control the actuation of the starter motor and the movement of the pinion to achieve the engagement with the ring gear independently from each other. Specifically, when the rotational speed of the engine is lower than a lower limit at which it is possible to start the engine without use of the starter motor and then higher than a given value, the vehicle control system actuates the starter motor before moving the pinion to bring the speed of the starter motor close to that of the ring gear and then moves the pinion to achieve the engagement with the ring gear. This achieves the restarting of the engine while the speed of the engine is dropping. However, when the pinion meshes the ring gear while the engine is rotating in the reverse direction, it will overload the starter motor. In order to eliminate an undesirable reduction in service life of the starter motor, the vehicle control system is inhibited from restarting the engine while the engine is reversing.

Japanese Patent No. 5251687 teaches a vehicle control system designed to avoid the above problems. The vehicle control system works to move the pinion to achieve engagement with the ring gear during the dropping of speed of the engine in the absence of an engine start request and then actuates the starter motor upon reception of the engine start request. This enables the engine to be started even in a swing (oscillation) period of time in which the engine alternately undergoes a normal rotation and a reverse rotation. The smaller a difference in rotational speed between the pinion and the ring gear, the longer the service life of the starter motor will be and also the smaller the noise arising from the impact of the pinion on the ring gear will be low. To this end, the vehicle control system, as taught in the above publication, is engineered to bring the pinion into engagement with the ring gear immediately before the engine is stopped.

The above vehicle control system is, as described above, capable of lowering the level of the noise emanating from the engagement of the pinion on the ring gear (which will also be referred to below as impact noise), but however, such noise occurs immediately before the engine is stopped in the idle stop mode or the vehicle is stopped, so that the level of the roadway noise or wind noise is very low, thus resulting in a high probability that the driver of the vehicle feels uncomfortable about the impact noise occurring in the preset mode in the course of the idle stop mode.

SUMMARY

It is therefore an object to provide a vehicle control system which is capable of alleviating a driver's perception about the impact noise arising from engagement of a pinion of an engine starter with a ring gear of an engine.

According to one aspect of the disclosure, there is provided a vehicle control system which is used in a vehicle equipped with an engine as a drive power source and works to establish engagement of a pinion of a starter motor with a ring gear mounted on a rotational axis of the engine and then actuate the starter motor to start the engine. The vehicle control system comprises: (a) an engine speed determiner which determines a rotational speed of the rotational axis of the engine; (b) a preset controller which executes a preset mode to move the pinion to achieve the engagement with the ring gear when the rotation speed, as determined by said engine speed determiner, has dropped below a given threshold value; and (c) a start controller which works to start the engine in response to a start request, the start controller. The preset controller determines the given threshold value as a function of a speed of the vehicle.

Usually, when the speed of the vehicle is high, the degree of noise arising from friction between wheels of the vehicle and the road surface (also called roadway noise) is high, so that the impact noise emanating from the pinion and the ring gear in the preset mode is overshadowed or drowned by the roadway noise. Conversely, when the speed of the vehicle is low, the roadway noise is usually low in level, so that the impact noise emanating from the pinion and the ring gear will be very audible. The continuous achievement of engagement between the pinion and the ring gear in the preset mode when the speed of the engine is still high will result in an increased length of time required to keep the engagement, in other words, an increased amount of electric power required to do it. Conversely, the execution of the preset mode when the speed of the engine is low will result in a decrease in length of time for which the engagement of the pinion with the ring gear is maintained, which leads to a reduction in consumption of the electrical power. The vehicle control system of this disclosure changes the threshold value based on the speed of the vehicle and initiates the preset mode when the rotational speed of the engine has dropped below the threshold value, in other words, executes the preset mode when the rotational speed of the engine is low when the level of the roadway noise is high, thereby causing the impact noise emanating from the pinion and the ring gear to be masked by the roadway noise and also resulting in a decrease in consumption of the electrical power in the preset mode. When the level of the road noise is low, the vehicle control system initiates the preset mode when the rotational speed of the engine is high, so that the impact noise generated upon the engagement of the pinion with the ring gear is overshadowed by the engine noise. The vehicle control system is, therefore, capable of minimizing the impact noise and the consumption of electrical power upon achievement of the preset mode in the vehicle and also quickly restarting the engine in response to the driver's restart request to the engine.

The preset controller may set the threshold value when the speed of the vehicle is higher to be smaller than that when the speed of the vehicle is lower. This enhances the above described beneficial effects provided by the vehicle control system.

The vehicle control system may also include a travel controller which executes a coasting mode to stop the engine to cut supply of drive power from the engine to a drive wheel of the vehicle or an idle stop mode to stop the engine before the vehicle is stopped based on the speed of the vehicle when a given operating condition is encountered. When one of the coasting mode and the idle stop mode is entered, the preset controller executes the preset mode. The given threshold value for use in the coasting mode is set smaller than that for use in the idle stop mode.

Usually, the speed of the vehicle in the coasting mode is higher than that in the idle stop mode. The impact noise emanating from the pinion and the ring gear is, thus, overshadowed by the roadway noise in the coasting mode. Alternatively, when the idle stop mode is entered, the vehicle control system initiates the preset mode when the rotational speed of the engine is high, so that the impact noise is overshadowed by the engine noise.

According to the second aspect of the disclosure, there is provided a vehicle control system which is used in a vehicle equipped with an engine as a drive power source and works to establish engagement of a pinion of a starter motor with a ring gear mounted on a rotational axis of the engine and then actuate the starter motor to start the engine. The vehicle control system comprises: (a) a travel controller which executes a coasting mode to stop the engine to cut supply of drive power from the engine to a drive wheel of the vehicle or an idle stop mode to stop the engine before the vehicle is stopped based on the speed of the vehicle when a given operating condition is encountered; (b) an engine speed determiner which determines a rotational speed of the rotational axis of the engine; (c) a preset controller which executes a preset mode to move the pinion to achieve the engagement with the ring gear when the rotation speed, as determined by said engine speed determiner, has dropped below a given threshold value in execution of one of the coasting mode and the idle stop mode; and (d) a start controller which works to start the engine in response to a start request. The preset controller determines the given threshold value for use in the coasting mode to be smaller than that for use in the idle stop mode.

The above structure of the vehicle control system eliminates the need for monitoring or determining the speed of the vehicle for use in execution of the preset mode, thereby also obviating the need for, for example, a map representing a relation between the speed of the vehicle and the threshold value, which results in a simplified structure of the vehicle control system.

The vehicle control system in either of the first and second aspects may be designed so that before the engagement of the pinion with the ring gear is achieved, the starter motor is actuated to set a difference between a rotational speed of the pinion and a rotational speed of the rotational axis of the engine (i.e., a rotational speed of the ring gear) to be smaller than a given value. This results in a decreased level of the impact noise upon engagement of teeth of the pinion with teeth of the ring gear.

Additionally, the preset controller may also work to move the pinion after stopping rotation of the starter motor. When the starter motor continues to rotate after engagement of the pinion with the ring gear, it may cause the torque of the starter motor to be transmitted to the rotational axis of the engine, so that the engine is restarted. The vehicle control system of this disclosure starts moving the pinion after stopping the rotation of the starter motor, thus avoiding the above problem.

The vehicle control system in either of the first and second aspects may be designed so that the preset controller works to continue to energize a drive unit to maintain the engagement of the pinion with the ring gear, and the preset controller stops energizing the drive unit when the rotation of the engine is determined to have been stopped.

Before the rotation of the engine is completely stopped, there is, as described above, the swing period of time in which the engine alternately undergoes a normal rotation and a reverse rotation. In the swing period of time, the area of contact between the pinion and the ring gear, therefore, alternately increases and decreases, thereby resulting in instability of the engagement of the pinion with the ring gear unless the drive unit continues to be energized. Alternatively, after the rotation of the engine is stopped completely, the area of contact between the pinion and the ring gear is almost kept constant, so that the engagement of the pinion with the ring gear will be stable without need for energizing the drive unit. The vehicle control system of this disclosure stops actuating the drive unit when the rotation of the engine is found to have been stopped, thus resulting in a decreased length of time the drive unit continues to be energized without sacrificing the stability of engagement between the pinion and the ring gear.

The vehicle control system in either of the first and second aspects may also include an electrical rotating machine which is joined to the rotational axis of the engine. When the pinion is in engagement with the ring gear when the start request is made, the start controller starts the engine using the electrical rotating machine.

Before being stopped completely, the engine, as described above, alternately experiences normal and reverse rotation. When the engine is rotating in the reverse direction, an increased degree of torque is usually required to restart the engine. The preset engagement of the pinion and the ring gear, however, serves to suppress the reverse rotation of the engine, thus resulting in a decreased degree of torque for restarting the engine. For this reason, the vehicle control system of this disclosure may be, as described above, equipped with the electrical rotating machine in addition to the starter motor. The vehicle control system is capable of actuating the electrical rotating machine with less power to restart the engine because the reverse rotation of the engine is suppressed by the preset engagement of the pinion with the ring gear.

The vehicle control system in either of the first and second aspects may also include an electrical rotating machine which is joined to the rotational axis of the engine. When the pinion is in engagement with the ring gear when the start request is made, the start controller may start the engine using the starter motor, while when the pinion is in disengagement from the ring gear when the start request is made, the start controller may start the engine using the electrical rotating machine. Therefore, in response to the driver's start request, the vehicle control system is capable of immediately actuating the available starting machine (i.e., the starter motor or the electrical rotating machine) to achieve a quick restart of the engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 3 is a flowchart of an engine starting control program executed by the vehicle control system of FIG. 1.

DESCRIPTION OF THE PREFERRED EMBODIMENTS

Figure 1:
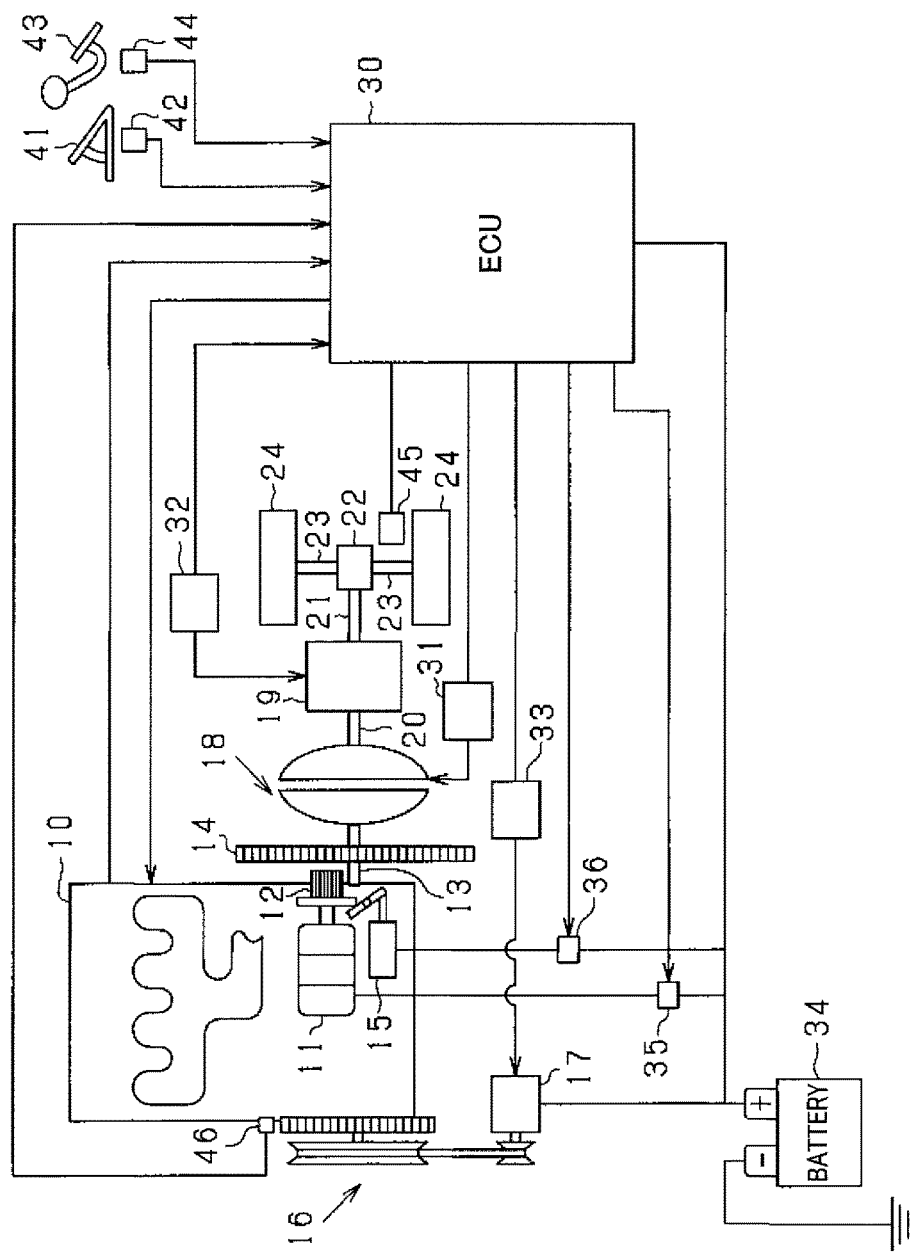
FIG. 1 is a schematic block diagram which illustrates a vehicle control system according to an embodiment.

Referring now to the drawings, there is shown a vehicle control system according to an embodiment which is mounted in a vehicle, such as an automobile, equipped with an engine as a drive power source.

In FIG. 1, the engine 10 is a multi-cylinder internal combustion engine in which fuel, such as gasoline or diesel oil, is combusted and which is equipped with typical fuel injectors and a typical igniter. The engine 10 has the starter motor 11 mounted thereon. The starter motor 11 has a rotational axis (i.e., an output shaft) on which the pinion 12 is mounted. The pinion 12 is engageable with the ring gear 14 mounted on the output shaft 13 (i.e., a rotational axis) of the engine 10. The starter motor 11 is equipped with the solenoid 15 which works to thrust the pinion 12 into engagement with the ring gear 14. The solenoid 15 works as a drive unit for the pinion 12. Specifically, when it is required to start the engine 10, the solenoid 15 works to move the pinion 12 in the axial direction thereof to make engagement with the ring gear 14, so that torque, as produced by the starter motor 11, is transmitted to the output shaft 13 of the engine 10.

To the output shaft 13 of the engine 10, the ISG (Integrated Starter Generator) 17 is joined through the power transmitter 16. The ISG 17 works as an electrical rotating machine. The power transmitter 16 includes a pulley and a belt. When it is required to supply the power to the output shaft 13 of the engine 10, the ISG 17 operates as an electric motor. Alternatively, when it is required to convert torque, as produced by the engine 10, into electrical power, the ISG 17 works as an electrical generator.

The output shaft 13 of the engine 10 is joined to the transmission 19 through the clutch 18. The clutch 18 is implemented by, for example, a frictional clutch which includes a pair of clutch mechanisms equipped with a disc (i.e., a flywheel) joined to the output shaft 13 of the engine 10 and a disc (i.e., a clutch disc) joined to the input shaft 20 of the transmission 19. When the discs of the clutch 18 are brought into contact with each other, the clutch 18 is placed in an engagement mode to transmit power between the engine 10 and the transmission 19. Alternatively, when the discs of the clutch 18 are disengaged from each other, the clutch 18 is placed in a disengagement mode to block the transmission of power between the engine 10 and the transmission 19. The clutch 18 of this embodiment is engineered as an automatic clutch which has, as described above, the engagement mode and the disengagement mode which are switched by an actuator such as an electrical motor. The clutch 18 may be installed inside the transmission 19.

The transmission 19 is engineered as an automatic transmission equipped with a plurality of gear ratios. The transmission 19 works to change the speed of power, as produced by the engine 10 and inputted into the input shaft 20, with a gear ratio selected as a function of the speed of the vehicle, the rotational speed of the engine 10, and the position of a shift lever (also called a selector) of the transmission 19 and outputs it from the output shaft 21. The shift lever is an operating lever of the transmission 19 and disposed near a driver's seat of the vehicle. The driver of the vehicle moves the shift lever to select one of a plurality of operating modes (i.e., the gear ratios) of the transmission 19. The transmission 19 of this embodiment has, as the positions of the shift lever, a forward position (also called a D-range), a reverse position (also called a R-range), and a neutral position (also called a N-range). The transmission 19 is equipped with an automatic shift mechanism made of an actuator such as an electric motor or a hydraulic actuator. In the D-range, the gear ratios are automatically changed from one to another. To the output shaft 21 of the transmission 19, the drive wheels 24 are joined through the differential gear 22 and the drive shaft 23.

The vehicle control system of this embodiment also includes the ECU (Electronic Control Unit) 30, the clutch controller 31, the transmission controller 32, and the motor controller 33. The ECU 30 works to control an entire operation of the control system. The clutch controller 31 works to control an operation of the clutch 18. The transmission controller 32 works to control an operation of the transmission 19. The motor controller 33 works to control an operation of the ISG 17. The ECU 30, the clutch controller 31, the transmission controller 32, and the motor controller 33 are each realized by a typical electronic control device equipped with a microcomputer and monitor outputs from sensors installed in the control system to control the operations of the engine 10, the clutch 18, the transmission 19, and the ISG 17. The ECU 30, the clutch controller 31, the transmission controller 32, and the motor controller 33 are joined together so that they are communicable with each other to share control signals or data signals with each other. The ECU 30 constitutes the vehicle control system, but however, the vehicle control system may alternatively be implemented by the ECU 30, the clutch controller 31, the transmission controller 32, and the motor controller 33.

The ECU 30 is electrically connected to the storage battery 34 and operates on power supplied from the battery 34. The battery 34 is joined to the starter motor 11 through the first relay 35 and also to the solenoid 15 through the second relay 36. The first relay 35 and the second relay 36 are closed, that is, connected in response to drive signals outputted from the ECU 30, respectively. When the first relay 35 is closed, the starter motor 11 is actuated by the power delivered from the battery 34. When the second relay 36 is closed, the solenoid 15 is actuated by the power from the battery 34 to thrust the pinion 12 into engagement with the ring gear 14.

The above described sensors include the accelerator sensor 42, the brake sensor 44, the wheel speed sensor 45, and the rotational speed sensor 46. The accelerator sensor 42 measures an amount by which the accelerator pedal 41 is depressed, that is, the position of the accelerator pedal 41. The brake sensor 44 measures an amount by which the brake pedal 43 is depressed, that is, the position of the brake pedal 43. The wheel speed sensor 45 measures the speed of the drive wheels 24. The rotational speed sensor 46 measure the rotational speed of the output shaft 13 of the engine 10. Outputs from these sensors are inputted into the ECU 30. The ECU 30 derives the position of the accelerator pedal 41, as measured by the accelerator sensor 42, as an accelerator position (i.e., an open position of a throttle valve). The ECU 30 also derives the speed of the drive wheels 24, as measured by the wheel speed sensor 45, as a vehicle speed. The vehicle control system also includes other sensors (not shown). The ECU 30 also serves as an engine speed determiner to determine the rotational speed of the output shaft 13 of the engine 10.

The ECU 30 analyzes the outputs from the sensors and information inputted from the transmission controller 32 to perform control tasks such as control of the quantity of fuel to be sprayed by the fuel injectors and ignition timing of the igniter of the engine 10. The clutch controller 31 performs a switching operation to engage or disengage the clutch 18 based on information inputted from the ECU 30. Similarly, the transmission controller 32 works to change the gear ratios of the transmission 19 based on information inputted from the ECU 30.

The ECU 30 also outputs control instructions to the motor controller 33. The motor controller 33 then controls the operation of the ISG 17 according to the control instructions from the ECU 30. Specifically, when the vehicle is accelerating, in other words, a greater degree of drive power or torque is required, the ISG 17 is actuated as an electrical motor. Alternatively, when the vehicle is decelerating or the amount of electric power remaining in the battery 34 is low, the IGS 17 is actuated as an electrical generator to charge the battery 34.

When a given coasting condition is encountered while the vehicle of this embodiment is being driven by the drive power or torque produced by the engine 10, the vehicle control system (i.e., the ECU 30) executes a coasting mode to stop the engine 10 and disengage the clutch 18, thereby cutting supply of the torque produced by the engine 10 to the drive wheels 24. Additionally, when the speed of the vehicle drops below a given value while the driver is depressing the brake pedal to decelerate the vehicle, the vehicle control system executes an idle stop mode (also called an automatic engine stop mode) to stop the engine 10. The coasting mode and the idle stop mode are used for improving the fuel efficiency in the vehicle. In execution of either of the coasting and idle stop modes, the ECU 30 works as a travel controller.

When the coasting mode is entered to stop the engine 10 or the idle stop mode is entered to stop the engine 10, the ECU 30 works as a preset controller to execute a preset mode which actuates the solenoid 15 to achieve engagement of the pinion 12 with the ring gear 14 before the speed of the engine 10 drops to zero.

In the preset mode, noise usually occurs when teeth of the pinion 12 impact teeth of the ring gear 14. The electric power is required to actuate the solenoid 15, so that the longer the length of time the solenoid 15 is energized, the greater the electric power will be. Usually, the engine 10 is in a swing (oscillation) mode where it alternately experiences a normal rotation and a reverse rotation before being stopped completely. In the swing mode, an area of contact between the pinion 12 and the ring gear 14 sequentially increases and then decreases. The deenergization of the solenoid 15 may, therefore, result in a risk that the pinion 12 disengages from the ring gear 14.

After the speed of the engine 10 drops to zero, the area of contact between the pinion 12 and the ring gear 14 is almost kept constant, thus ensuring the stability in engagement of the pinion 12 and the ring gear 14. It is, thus, advisable that the solenoid 15 be deenergized after the speed of the engine 10 becomes zero, and the stability of the engagement between the pinion 12 and the ring gear 14 is established. The achievement of engagement between the pinion 12 and the ring gear 14 when the speed of the engine 10 is still high will result in an increased length of time the solenoid 15 is energized, but it will cause the impact noise arising from the engagement between the pinion 12 and the ring gear 14 to be masked by noise of the engine 10.

Accordingly, when the preset mode is required to be entered, the vehicle control system of this embodiment monitors the speed of the engine 10 and starts supplying the electric power to the solenoid 15 when the speed of the engine 10 has dropped below a preselected threshold value. Usually, when the speed of the vehicle is high, the degree of noise arising from friction between the wheels of the vehicle and the road surface (also called roadway noise) is high, so that the impact noise emanating from the pinion 12 and the ring gear 14 is overshadowed by the roadway noise. Conversely, when the speed of the vehicle is low, the roadway noise is usually low in level, so that the impact noise emanating from the pinion 12 and the ring gear 14 will be very audible.

In view of the above fact, when the speed of the vehicle is high at the time when it is required to start the preset mode, the vehicle control system decreases the threshold value used to be compared with the speed of the engine 10 as compared with when the speed of the vehicle is low. This causes the impact noise emanating from the pinion 12 and the ring gear 14 to be overshadowed by the roadway noise and also results in a decrease in period of time for which the solenoid 15 is energized to reduce the consumption of electrical energy in the battery 34. Alternatively, when the speed of the vehicle is low at the time when it is required to start the preset mode, the vehicle control system increases the threshold value to mask the impact noise by the noise of the engine 10. The threshold value may be switched between two discrete values when the speed of the vehicle reaches a given value or alternatively changed linearly in proportion to the speed of the vehicle or stepwise with a change in speed of the vehicle.

The preset mode will be described below in detail with reference to FIGS. 2(*a*) and 2(*b*). FIG. 2(*a*) demonstrates the case where the preset mode is entered when the speed of the vehicle is high. FIG. 2(*b*) demonstrates the case where the preset mode is entered when the speed of the vehicle is low. In the example of FIG. 2(*a*) where the speed of the vehicle is high, the engine 10 is stopped in the coasting mode, while in the example of FIG. 2(*b*) where the speed of the vehicle is low, the engine 10 is stopped in the idle stop mode.

Figure 2A:
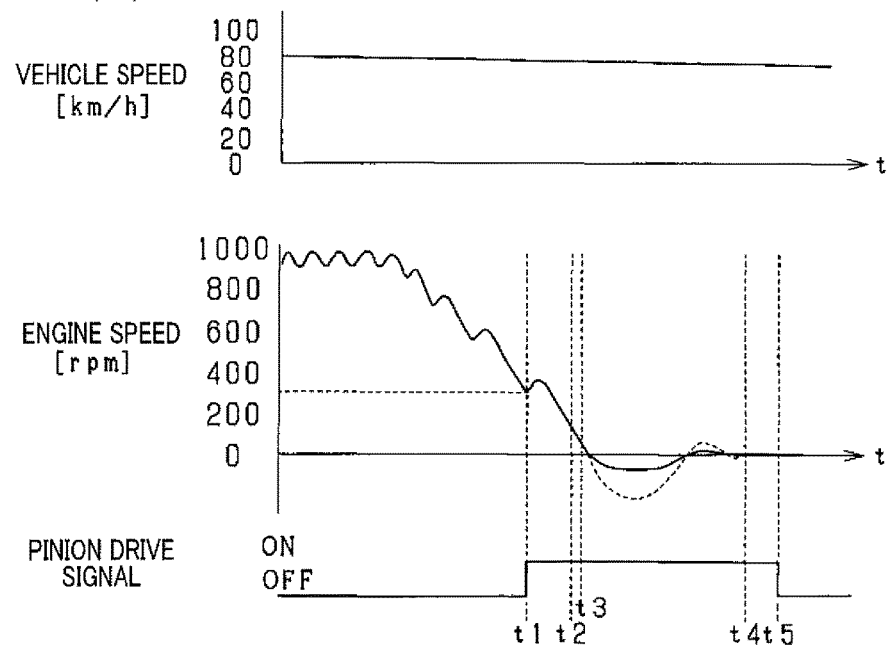
FIGS. 2(a) and 2(b) are time charts which demonstrates operations of the vehicle control system of FIG. 1.
Figure 2B:
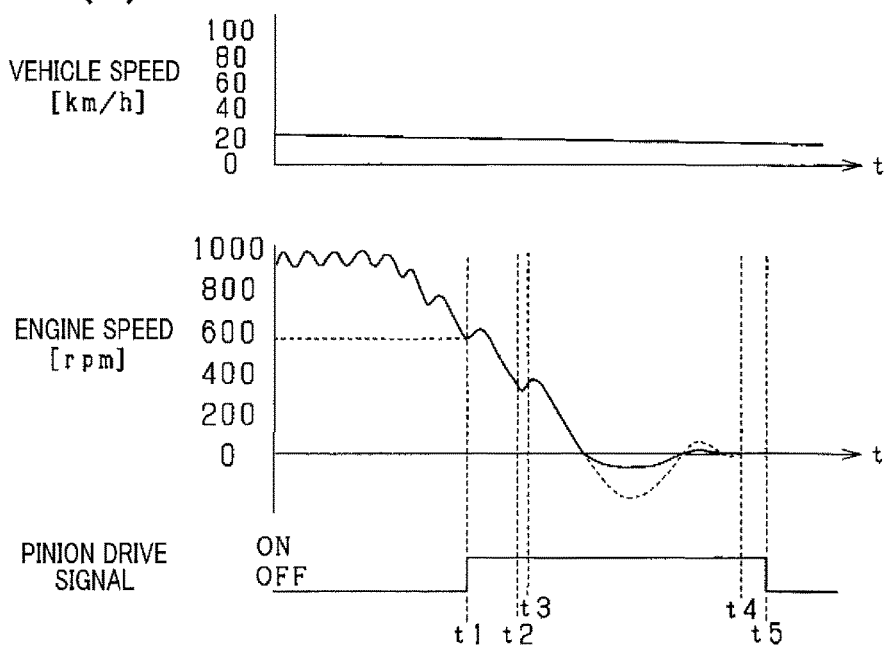

In each of the examples of FIGS. 2(*a*) and 2(*b*), the speed of the engine 10 is lower than or equal to the threshold value at time t1, so that the preset mode is initiated. The threshold value is, as described above, set smaller when the speed of the vehicle is high than that when the speed of the vehicle is low. Specifically, in the example of FIG. 2(*a*) where the speed of the vehicle is high, the threshold value is selected to be 300 rpm, while in the example of FIG. 2(b) where the speed of the vehicle is low, the threshold value is selected to be 600 rpm. The threshold value in each of FIGS. 2(a) and 2(b) is just one example. The threshold value when the speed of the vehicle is high only needs to be smaller than that when the speed of the vehicle is low.

After the preset mode is entered, the pinion 12 is moved to the ring gear 14 and then contacts it at time t2, so that impact noise occurs. At time t3, the pinion 12 meshes the ring gear 14. Afterwards, the rotation of the engine 10 swings, that is, the engine 10 rotates in the normal direction and then reverses alternately until time t4. The pinion 12 is kept in engagement with the ring gear 14, thus suppressing the swing motion of the output shaft 13 of the engine 10. In FIGS. 2(a) and 2(b), a change in speed of the engine 10 in a period of time for which the engine 10 continues to swing is indicated by a solid line when the preset mode is entered and a broken line when the preset mode is not entered. When the speed of the engine 10 is found to have dropped to zero at time t5, the vehicle control system stops supplying the electric power to the solenoid 15 because the stability of engagement of the pinion 12 and the ring gear 14 is ensured by the friction therebetween.

After the preset mode is executed in the above way, the ECU 30 waits until a start request (i.e., an engine restart request) is made by the driver of the vehicle. When the vehicle is in the coasting mode, the engine restart request is provided by, for example, driver's depression of the accelerator pedal 41 which is detected by the accelerator sensor 42 or driver's release of the brake pedal 43 which is detected by the brake sensor 44. When the driver's operation on the accelerator pedal 41 or the brake pedal 43 is made before the preset mode is entered after the fuel supply to the engine 10 is cut, the ECU 30 actuates the ISG 17 as an electric motor to start the engine 10 or resumes only injection of fuel to start the engine 10. When it is required to start the engine 10 in the above way, the ECU 30 serves as a start controller.

FIG. 3 is a flowchart of a sequence of logical steps or program to be executed by the ECU 30.

After entering the program, the routine proceeds to step S101 wherein it is determined whether supply of fuel to the engine 10 is stopped or not. If a NO answer is obtained meaning that the supply of fuel to the engine 10 is not cut off, that is, there is no need for restarting the engine 10, then the routine terminates. Alternatively, if a YES answer is obtained in step S101, then the routine proceeds to step S102 wherein the threshold value for use in comparison with the rotational speed of the engine 10 is determined as a function of the speed of the vehicle. The routine then proceeds to step S103 wherein it is determined whether a starter request (i.e., an engine restart request) has been made by the driver of the vehicle or not. For example, when the driver's depression of the accelerator pedal 41 is detected, the ECU 30 determines that the start request has been made by the driver to start the engine 10.

If a YES answer is obtained in step S103 meaning that the start request has been made, then the routine proceeds to step S104 wherein the speed of the engine 10 is higher than or equal to a given value or not. The given value is a speed of the engine 10 which enables the engine 10 to be restarted by injecting fuel into the engine 10 and then igniting it without need for the power from the starter motor 11 or the ISG 17 and which is greater than an upper limit of the threshold value used to determine whether the preset mode should be started or not. If a YES answer is obtained in step S104 meaning that the speed of the engine 10 is higher than or equal to the given value, then the routine proceeds to step S105 wherein the fuel is injected into the engine 10 and then ignited to restart the engine 10 without supplying the electric power to the starter motor 11 and the ISG 17.

Alternatively, if a NO answer is obtained in step S104 meaning that the speed of the engine 10 is not higher than the given value, then the routine proceeds to step S106 wherein it is determined whether the speed of the engine 10 is higher than or equal to the threshold value, as derived in step S102, or not. If a YES answer is obtained meaning that the speed of the engine 10 is higher than or equal to the threshold value, it means that the preset mode is not yet entered. The routine then proceeds to step S107 wherein the ISG 17 is actuated to restart the engine 10. Alternatively, if a NO answer is obtained in step S106 meaning that the speed of the engine 10 is lower than the threshold value, then the routine proceeds to step S108 wherein it is determined whether the preset mode is being executed to bring the pinion 12 into engagement with the ring gear 14 or not. For instance, it is determined in step S108 whether a given period of time has passed after the preset mode is started or not. If a YES answer is obtained meaning that the preset mode is being executed, then the routine proceeds to step S109 wherein the starter motor 11 is energized to restart the engine 10. Alternatively, if a NO answer is obtained in step S108 meaning that the preset mode is not being executed, then the routine proceeds to step S110 wherein the ISG 17 is actuated to restart the engine 10.

If a NO answer is obtained in step S103 meaning that the starter request is not made by the driver of the vehicle, then the routine proceeds to step S111 wherein it is determined whether the speed of the engine 10 is lower than or equal to the threshold value or not. The speed of the engine 10, as already described in FIGS. 2(a9 and 2(b), does not decrease linearly, but lowers to zero while alternately increasing and decreasing. Therefore, once a YES answer is obtained in step S111, such determination is kept for a preselected period of time. Alternatively, a YES answer may be obtained in step S111 when the speed of the engine 10 is kept lower than the threshold value for a given control cycle.

If a YES answer is obtained in step s111 meaning that the speed of the engine 10 is lower than or equal to the threshold value, then the routine proceeds to step S112 wherein it is determined whether the speed of the engine 10 is zero or not. If the determination of step S112 is made in a swing period of time for which the engine 10 alternately undergoes a normal rotation and a reverse rotation, the engine 10 has not yet completely been stopped, but a YES answer may be obtained. In order alleviate this problem, when the speed of the engine 10 is kept zero for a given period of time, a YES answer is obtained in step S112. Alternatively, if a NO answer is obtained in step S112 meaning that the speed of the engine 10 is not zero, then the routine proceeds to step S113 wherein the solenoid 15 is actuated to move the pinion 12 for bringing the pinion 12 into engagement with the ring gear 14 or keeping the pinion 12 engaging the ring gear 14.

Alternatively, if a NO answer is obtained in step S111 meaning that the speed of the engine 10 is not lower than or equal to the threshold value or if a YES answer is obtained in step S112 meaning that the speed of the engine 10 is zero and that the engagement of the pinion 12 with the ring gear can be kept without need for energizing the solenoid 15, then the routine terminates without supplying the electric power to the solenoid 15.

When the condition where a YES answer is obtained in step S101 meaning that the engine 10 is undergoing a fuel cut, and a NO answer is obtained in step S102 meaning that the start request is not made by the driver of the vehicle continues, it will cause the speed of the engine 10 to drop with time. The speed of the engine 10 will, therefore, become lower than the threshold value in the future, so that the preset mode is started to move the pinion 12.

The vehicle control system of this embodiment offers beneficial advantages, as discussed below.

The vehicle control system is, as apparent from the above discussion, engineered to alter the threshold value as a function of the speed of the vehicle and enter the preset mode when the speed of the engine 10 has dropped below the threshold value. Specifically, when the level of the roadway noise is high, and the speed of the engine 10 is low, the vehicle control system executes the preset mode, thereby decreasing the consumption of electric power in the vehicle. Alternatively, when the level of the roadway noise is low, and the speed of the engine 10 is high, the vehicle control system executes the preset mode, thereby masking the impact noise emanating from the pinion 12 and the ring gear 14 with the noise of the engine 10. The vehicle control system of this embodiment is capable of minimizing the impact noise and the consumption of electrical energy upon achievement of the preset mode in the vehicle and also quickly starting the engine 10 in response to the driver's restart request to the engine 10.

The ISG 17 is joined to the output shaft 13 of the engine 10. The restart of the engine 10 is, therefore, achieved by actuating the ISG 17 before the preset mode is executed, thus ensuring a quick restart of the engine 10. The ISG 17 is joined to the output shaft 13 of the engine 10 through the power transmitter 26 made up of the pulley and the belt, thus minimizing mechanical noise when the ISG 17 is actuated to start the engine 10.

Before the rotation of the engine 10 is completely stopped, there is, as described above, the swing period of time in which the engine 10 alternately undergoes a normal rotation and a reverse rotation. In the swing period of time, the area of contact between the pinion 12 and the ring gear 14, therefore, alternately increases and decreases, thereby resulting in a difficulty in keeping the engagement of the pinion 12 with the ring gear 14 unless the drive unit (i.e., the solenoid 15) continues to be energized. Alternatively, after the rotation of the engine 10 is stopped completely, the area of contact between the pinion 12 and the ring gear 14 is almost kept constant, so that the engagement of the pinion 12 with the ring gear 14 is maintained without need for energizing the drive unit. The vehicle control system of this embodiment stops actuating the drive unit when the rotation of the engine 10 is found to have been stopped, thus resulting in a decreased length of time the drive unit continues to be energized without sacrificing the stability of engagement between the pinion 12 and the ring gear 14.

Modifications

The vehicle control system of the above embodiment, as described above, determines the speed of the vehicle and then calculates the threshold value used for the preset mode as a function of the determined speed, but may alternatively be designed to determine the threshold value depending upon which of the coasting mode and the idle stop mode has been entered when the engine 10 is stopped. Specifically, the threshold value in the coasting mode is selected to be smaller than that in the idle stop mode, thereby eliminating the need for obtaining the speed of the vehicle when it is required to execute the preset mode and using the map listing the relation between the speed of the vehicle and the threshold value. This results in simplified operations of the vehicle control system.

The output shaft 13 of the engine 10 is, as described above, joined to the ISG 17, but however, may instead be connected to a MG (Motor Generator).

When the preset mode is entered, the vehicle control system of this embodiment works to restart the engine 10 using the starter motor 11 to rotate the pinion 12 in response to the start request, but may alternatively be designed to use the ISG 17 to restart the engine 10 in the preset mode. Specifically, when the pinion 12 is in engagement with the ring gear 14 in the preset mode, the ECU 30 may start the engine 10 using the ISG 17 in response to the start request. As illustrated in FIGS. 2(*a*) and 2(*b*), the preset mode serves to suppress the reverse rotation of the engine 10, thus resulting in a decreased degree of torque required to restart the engine 10.

When it is required to execute the preset mode, the starter motor 11 may be actuated to rotate the pinion 12 before the solenoid 15 starts to be energized. In this case, a period of time in which the starter motor 11 is energized is preferably controlled to set a difference between a rotational speed of the pinion 12 and the threshold value to be smaller than a given value, e.g., fall in a given range for decreasing a relative speed of the teeth of the pinion 12 to those of the ring gear 14 when the solenoid 15 is actuated to mesh the pinion 12 with the ring gear 14 to reduce the level of noise generated when the pinion 12 meshes the ring gear 14. When such a control mode is performed, the vehicle control system stops supplying the electric power to the starter motor 11 before energizing the solenoid 15 to move the pinion 12 or the pinion 12 impacts the ring gear 14, thereby preventing the engine 10 from being started by the torque produced by the starter motor 11.

The vehicle control system, as described above, uses the solenoid 15 as the drive unit for the pinion 12 and works to energize the solenoid 15 to bring the pinion 12 into engagement with the ring gear 14, but however, may alternatively be designed to use a known means as the drive unit for the pinion 12 instead of the solenoid 15.

The vehicle control system of the above embodiment is mounted, as an example, in the vehicle operated by the human driver, but may alternatively be employed with vehicles engineered to be at least partially accelerated or decelerated in an automatic mode. In this case, the vehicle control system may stop the engine 10 to execute the coasting mode or the idle stop mode when a distance between the vehicle and another preceding vehicle becomes short and then execute the preset mode to restart the engine 10 when the distance to the preceding vehicle becomes long.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A vehicle control system which is used in a vehicle equipped with an engine as a drive power source and establishes engagement of a pinion of a starter motor with a ring gear mounted on a rotational axis of the engine and actuates the starter motor to start the engine, the vehicle control system comprising:

a travel controller configured to execute: (i) a coasting mode to stop the engine to cut supply of drive power from the engine to a drive wheel of the vehicle, and (ii)

an idle stop mode to stop the engine before the vehicle is stopped based on the speed of the vehicle when a given operating condition is satisfied;

an engine speed determiner determining a rotational speed of the rotational axis of the engine;

a preset controller configured to execute a preset mode to move the pinion to engage with the ring gear when the rotation speed, as determined by the engine speed determiner, is below a determined threshold value in execution of one of the coasting mode and the idle stop mode, the preset controller determining the predetermined threshold value of the coasting mode to be smaller than the predetermined threshold value of the idle stop mode; and a start controller configured to start the engine in response to a start request.

2. The vehicle control system as set forth in claim 1, wherein before the engagement of the pinion with the ring gear is achieved, the starter motor is actuated to set a difference between a rotational speed of the pinion and the determined threshold value to be smaller than a given value.

3. The vehicle control system as set forth in claim 2, wherein the preset controller moves the pinion after stopping rotation of the starter motor.

4. The vehicle control system as set forth in claim 1, wherein:

the preset controller energizes a drive unit to maintain the engagement of the pinion with the ring gear, and the preset controller stops energizing the drive unit when the rotation of the engine is determined to have been stopped.

5. The vehicle control system as set forth in claim 1, wherein:

an electrical rotating machine is joined to the rotational axis of the engine, and when the pinion is engaged with the ring gear when the start request is made, the start controller starts the engine using the electrical rotating machine.

6. The vehicle control system as set forth in claim 1, wherein:

an electrical rotating machine is joined to the rotational axis of the engine, when the pinion is engaged with the ring gear when the start request is made, the start controller starts the engine using the starter motor, and when the pinion is disengaged from the ring gear when the start request is made, the start controller starts the engine using the electrical rotating machine.

\* \* \* \* \*